June 4, 1929.  H. NEUMANN  1,715,423
CLUSTER BASKET
Filed April 26, 1926
Fig. 1.
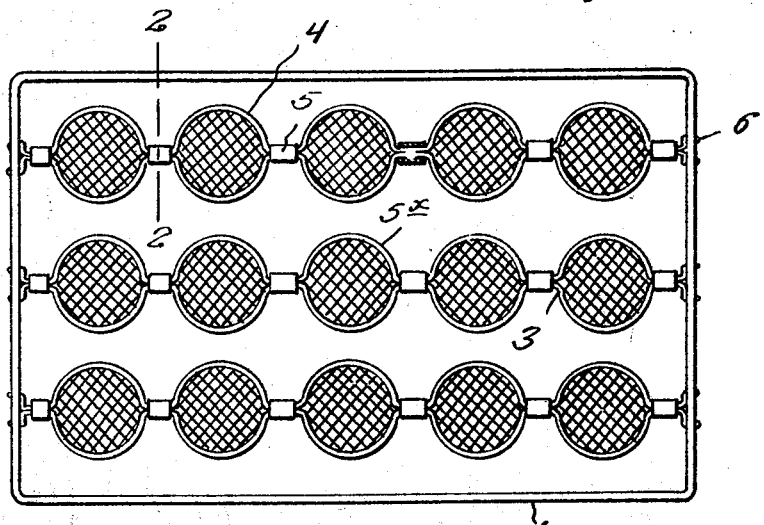
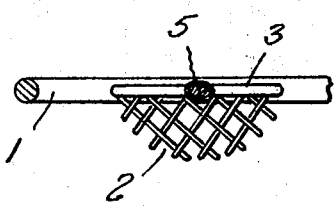
Fig. 2.
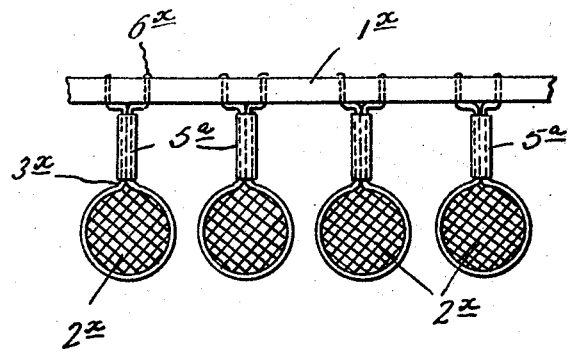
Fig. 3.
*Inventor*
H. Neumann,
By *Clarence A. O'Brien*
*Attorney*

Patented June 4, 1929.

1,715,423

UNITED STATES PATENT OFFICE.

HERBERT NEUMANN, OF ELGIN, ILLINOIS, ASSIGNOR OF ONE-THIRD TO PAUL A. REICHE, OF DUNDEE, ILLINOIS, AND ONE-THIRD TO HAROLD R. BALDWIN, OF CARPENTERSVILLE, ILLINOIS.

CLUSTER BASKET.

Application filed April 26, 1926. Serial No. 104,714.

My present invention has to do with the manufacture of chocolate coated nut clusters and one of its objects is the provision of a peculiar and advantageous cluster basket designed for use in facilitating the manufacture indicated.

Another object of the invention is the provision of a series of the said baskets constructed in a straight line.

Another object is the provision of a frame or unit comprising a plurality of the said lines of baskets so arranged that the plurality of baskets may be handled as one piece.

To the attainment of the foregoing, the invention consists in the improvement as hereinafter described and definitely claimed.

In the accompanying drawings, forming part of this specification:—

Figure 1 is a top plan view showing a tray or frame constructed in accordance with my invention and including a plurality of baskets.

Figure 2 is an enlarged fragmentary section taken in the plane indicated by the line 2—2 of Figure 1.

Figure 3 is a view showing a plurality of cluster baskets of my invention on a rod-like element for use in the manufacture of chocolate coated nut clusters.

Similar numerals designate corresponding parts in Figures 1 and 2 to which reference will first be made.

I show in Figure 1 a rectangular frame 1 of galvanized wire of suitable caliber or of any other material compatible with the purpose of the device. I also show in Figure 1 and also in Figure 2 not only the frame 1, but baskets 2 of appropriate mesh screen, the mesh employed being preferably one fourth of an inch and the screen being fixed to a basket rim 3, preferably by soldering, though the connection may obviously be effected in any other approved manner without affecting my invention. The rims 3 of the baskets 2 in each of the lines shown in Figure 1 are formed of two wires 4 in combination with means between the several baskets and outwardly beyond the end baskets for holding the pieces of wire together in parallel relation, the said means being by preference in the form of sleeves 5 held in fixed position with the assistance of solder or the like. It will be noted that the rim of each of the said baskets in the line is made up of two opposite semi-circular portions $5^x$, and that the ends of the wires are spread apart as designated by 6 and are hooked over or otherwise connected to opposite bars of the frame 1.

In Figure 3, I show a rod-like element $1^x$, and I also show a plurality of baskets $2^x$ connected with the said element $1^x$, the said elements $2^x$ being respectively carried by a single wire $3^x$ having a rim portion to which the mesh screen is connected and also having a shank portion formed by parallel stretches of the wire which terminate in hooks $6^x$ spaced apart and placed about the element $1^x$, the said stretches of wire being encompassed by a sheet metal winding or binding $5^a$, preferably maintained in position by solder.

I would have it understood that my novel baskets are adapted to be used to advantage either by hand or in an apparatus of suitable design for the manipulation or use of the same.

The embodiment of my invention shown in Figure 1 is for hand dipping operation. The baskets are dipped into a soft mixture of nuts and chocolate while the chocolate is in a molten state. Thereafter the unit shown in Figure 1 is placed upon a chocolate machine, where the surplus chocolate is shaken off. Then the clusters are dropped from the baskets on a drying board where the chocolate is permitted to harden and form what is known in the candy trade as chocolate coated nut clusters. When the embodiment shown in Figure 3 is employed, nuts are picked up in the baskets and carried under and into a flowing stream of molten chocolate which manifestly will coat the nuts. The clusters formed as stated in the baskets are carried out of the stream of chocolate and after the surplus chocolate has been shaken off, the clusters are dropped and the chocolate is permitted to harden.

I have specifically described the construction and relative arrangement of the parts embraced in the present and preferred embodiment of my invention in order to impart an exact understanding of the said embodiment. I do not desire, however, to be understood as limiting myself to the structures disclosed, my invention being defined by my appended claim within the scope of which modifications may be made without departure from my invention.

Having described my invention, what I claim and desire to secure by Letters Patent, is:—

A dipping unit for use in the manufacture of chocolate coated nut clusters, comprising a frame bar, screen baskets spaced apart in a series parallel to said bar, wire rims for said screen baskets joined thereto and having circular portions and also having portions in parallelism and close together terminating in hooks engaging the frame bar and connecting the baskets thereto, and means binding the parallel wire portions of each wire rim together.

In testimony whereof I affix my signature.

HERBERT NEUMANN.